G. R. RICH.
RIVET SET.
APPLICATION FILED DEC. 13, 1918.
1,314,215.
Patented Aug. 26, 1919.
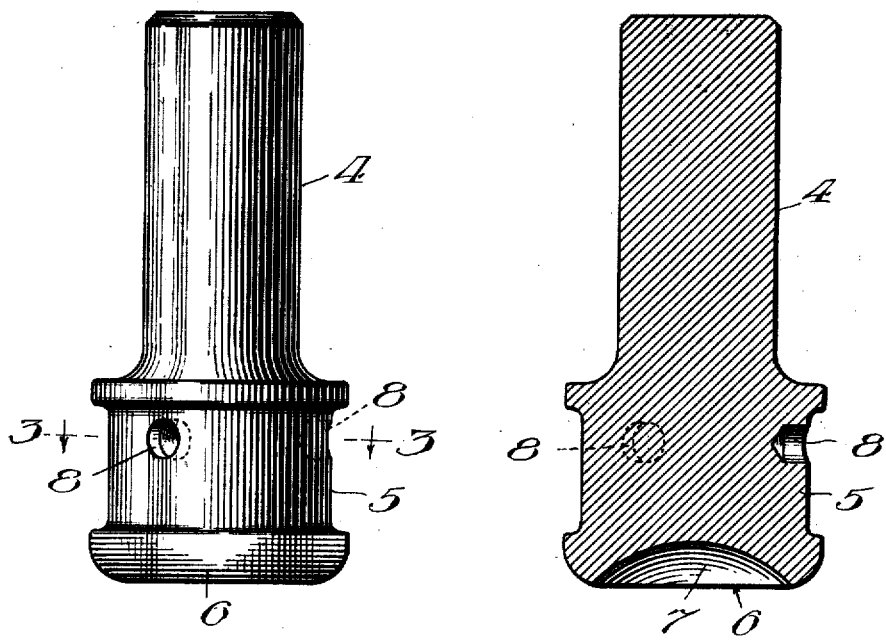
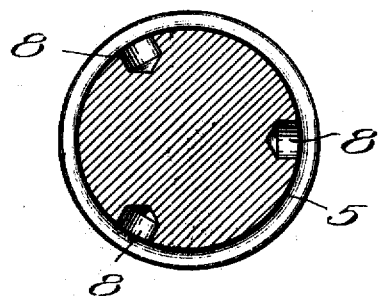
WITNESSES:
Harry S. Gaither
INVENTOR
George R. Rich
BY
Charles O. Shervey,
his ATTORNEY.

UNITED STATES PATENT OFFICE.

GEORGE R. RICH, OF BATTLE CREEK, MICHIGAN, ASSIGNOR TO RICH STEEL PRODUCTS COMPANY, OF BATTLE CREEK, MICHIGAN, A CORPORATION OF MICHIGAN.

RIVET-SET.

1,314,215.  Specification of Letters Patent.  Patented Aug. 26, 1919.

Application filed December 13, 1918. Serial No. 266,554.

*To all whom it may concern:*

Be it known that I, GEORGE R. RICH, a citizen of the United States, and a resident of Battle Creek, Calhoun county, and State of Michigan, have invented certain new and useful Improvements in Rivet-Sets, of which the following is declared to be a full, clear, and exact description.

This invention relates to rivet sets and its principal objects are, to improve the efficiency of tools of this class, to increase their durability, to obtain greater uniformity in their heat treatment and to minimize the danger of crystallization throughout the tool. From past experience, I have observed that frequently a weak place occurs on the shanks of rivet sets, said weak place occurring at a point adjacent its juncture with the head portion. This weak place results from non-uniformity in the heat treatment of the tool, the shank being heated throughout to the proper temperature, while the core of the head portion often is not heated throughout to the same degree of temperature. As a result, in hardening the tool there is a differential in the cooling of the metal, with a resulting differential in the disposition of the molecules in the shank portion and head portion, a weak place occurring, very frequently in the shank close to the head.

I have discovered that by making provision for the direct application of the heat, closer to the core or center of the head portion, a more even distribution of the heat throughout the shank and head is possible, whereby the entire tool may be heated more uniformly throughout, and the danger of crystallization at the ordinarily weak place is thereby reduced to a minimum.

The invention consists in a tool having a shank and a head of larger diameter than the shank, formed with one or more recesses, depressions or sockets extending in from its surface at places adjacent the juncture between the shank and head, whereby the tool may be heated more uniformly throughout, in the heat treating process. The invention also consists in the other novel features hereinafter set forth and claimed.

The invention is clearly illustrated in the accompanying drawing, in which:—

Figure 1, is a side elevation of a tool embodying a simple form of the present invention; Fig. 2, is a central, longitudinal section through the same and Fig. 3, is a horizontal section taken on the line 3—3 of Fig. 1.

In the embodiment of the invention illustrated in said drawing, the reference character 4, designates the shank and 5, the head of a tool, here shown in the form of a rivet set, such as is commonly employed in connection with pneumatic hammers for heading rivets.

The heads of rivet sets are of greater diameter than the shanks and may vary in diameter, but the shank portions usually remain constant. In the face 6, of the head shown, is formed a concavity 7 of a shape to correspond to the shape to be given the rivet head.

In the head portion 5, is formed one or more recesses, depressions, sockets or the like 8, which may take various forms, and said recesses extend into the body of the head to a depth about coincident with the cylindrical plane, constituting the face of the shank portion. In the form of the invention illustrated in the drawing, the depressions are formed by drilling into the body of the head to a depth coincident with a line extending into the head from the face of the shank. When drilled holes are employed, the holes are spaced equidistant around the face of the head. As a matter of practice, it is preferable not to drill below the plane of the face of the shank, thus leaving the solid body from the shank to the face of the concavity 7, intact, whereby the lines of force from the shank of the rivet head will not be broken, as would be the case if the holes were bored deeper.

The body of the tool is forged in the usual and well known manner and the recesses or depressions are formed prior to the heat treatment of the hardening process. The tool is then heated in the usual and customary manner in hardening it, and because of the depressions in the head, the core or center of the head is exposed to the influence of the heat and practically heated to the same degree of heat as the core or center of the shank portion.

In other words, the heat is conducted into the core of the head adjacent the shank, as rapidly as in the shank and a substantially uniform degree of heat is conducted to the center or core. When the tool is plunged into the quenching bath, it is cooled uniformly throughout.

More or less variation of the exact details of construction is possible without departing from the spirit of this invention; I desire, therefore, not to limit myself to the exact form of construction shown and described, but intend, in the following claims, to point out all of the invention disclosed herein.

I claim as new and desire to secure by Letters Patent:

1. As a new article of manufacture, a tool comprising a shank, and a head of greater diameter than the shank and formed integral therewith and having reëntrant surfaces extending to places approximately in line with the face of the shank, whereby the core of the head may receive substantially the same degree of hardness as that of the shank in the process of hardening the tool.

2. As a new article of manufacture, a rivet set comprising a shank and a laterally recessed head of greater diameter than the shank, the core of said head having substantially the same degree of hardness as the shank.

GEORGE R. RICH.

Copies of this patent may be obtained for five cents each, by addressing the "Commissioner of Patents, Washington, D. C."